(12) United States Patent
Martin et al.

(10) Patent No.: US 10,982,632 B1
(45) Date of Patent: Apr. 20, 2021

(54) REFUELING CONTROL SYSTEMS AND METHODS FOR PRESSURIZED VEHICLE FUEL SYSTEMS

(71) Applicant: FORD GLOBAL TECHNOLOGIES, LLC, Dearborn, MI (US)

(72) Inventors: David Scott Martin, Dearborn, MI (US); Roshini Venkatesh, Canton, MI (US); Brent Edward Sealy, Canton, MI (US); Alan Robert Dona, Huntington Woods, MI (US); Dennis Seung-Man Yang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/809,865

(22) Filed: Mar. 5, 2020

(51) Int. Cl.
*F02M 25/08* (2006.01)
*B60K 15/035* (2006.01)
(Continued)

(52) U.S. Cl.
CPC ... *F02M 37/0052* (2013.01); *B60K 15/03504* (2013.01); *B60K 15/03519* (2013.01); *F02M 25/089* (2013.01); *F02M 25/0836* (2013.01); *F02M 37/0023* (2013.01); *B60K 2015/0319* (2013.01); *B60K 2015/03514* (2013.01); *B60K 2015/03576* (2013.01); *F02M 2037/087* (2013.01)

(58) Field of Classification Search
CPC .............. F02M 25/08; F02M 25/0818; F02M 25/0836; F02M 25/089; F02M 2025/0845; F02M 37/0023; B60K 15/03504; B60K 15/03519; B60K 15/04; B60K 2015/0319; B60K 2015/03296; B60K 2015/03302; B60K 2015/03514; B60K 2015/03576; B60K 2015/0458; B60K 2015/0461
See application file for complete search history.

(56) References Cited

U.S. PATENT DOCUMENTS 5,568,828 A * 10/1996 Harris ............... B60K 15/04 137/514.5
5,630,445 A * 5/1997 Horiuchi ............. B60K 15/04 137/507

(Continued)

FOREIGN PATENT DOCUMENTS

DE  10020000 A1 * 12/2001 ............. B60K 15/04
KR  100216785 B1    9/1999
WO  WO-2017045830 A1 * 3/2017 ............. B60K 15/04

*Primary Examiner* — John M Zaleskas
(74) *Attorney, Agent, or Firm* — David B. Kelley; Carlson, Gaskey & Olds

(57) ABSTRACT

This disclosure is directed to vehicle fuel systems capable of isolating the energy within a fuel tank from the vehicle user. An exemplary fuel system may include a first valve located within a fuel inlet conduit and a second valve located within a vapor recovery recirculation line of the fuel system. The first and second valves may be controlled based on the pressure inside a fuel tank of the fuel system. Fuel may only be transferred into the fuel tank when the fuel tank is within a predefined threshold pressure range. A depressurization sequence of the fuel tank may be automatically initiated when a fuel door of the fuel system is moved to an open position. The positioning of the fuel door may be monitored by a fuel door position monitoring device.

20 Claims, 3 Drawing Sheets

(51) Int. Cl.
  *B60K 15/03* (2006.01)
  *F02M 37/00* (2006.01)
  *F02M 37/08* (2006.01)

(56) References Cited

U.S. PATENT DOCUMENTS

| | | | | |
|---|---|---|---|---|
| 6,289,947 | B1* | 9/2001 | Heimbrodt | B60K 15/035 141/128 |
| 6,854,492 | B2* | 2/2005 | Benjey | B60K 15/03519 123/519 |
| 9,415,680 | B2 | 8/2016 | Dudar et al. | |
| 9,855,839 | B2 | 1/2018 | Dedeurwaerder | |
| 10,240,542 | B1* | 3/2019 | Salter | F02N 11/08 |
| 2002/0023688 | A1* | 2/2002 | Enge | F02M 25/089 141/5 |
| 2003/0140970 | A1* | 7/2003 | Benjey | B60K 15/03504 137/587 |
| 2008/0236685 | A1* | 10/2008 | Nourdine | B60K 15/04 137/599.18 |
| 2012/0152210 | A1* | 6/2012 | Reddy | F02M 25/089 123/520 |
| 2014/0026992 | A1* | 1/2014 | Pearce | B60K 15/035 137/561 R |
| 2014/0352796 | A1* | 12/2014 | Dudar | B60K 15/035 137/15.01 |
| 2015/0006059 | A1* | 1/2015 | Castleberry | F02M 25/0222 701/102 |
| 2015/0032307 | A1* | 1/2015 | Lindlbauer | B60K 15/035 701/22 |
| 2015/0068498 | A1* | 3/2015 | Peters | F02D 41/003 123/520 |
| 2015/0083089 | A1* | 3/2015 | Pearce | F02M 25/0809 123/520 |
| 2015/0306953 | A1* | 10/2015 | Dudar | B60K 15/05 137/14 |
| 2015/0308389 | A1* | 10/2015 | Bolger | F02M 25/0836 123/519 |
| 2015/0369150 | A1* | 12/2015 | Dudar | F02D 41/0032 123/519 |
| 2015/0369151 | A1* | 12/2015 | Dudar | F17C 5/02 141/4 |
| 2016/0144711 | A1* | 5/2016 | Criel | B60K 15/03504 137/14 |
| 2016/0152132 | A1* | 6/2016 | Dedeurwaerder | F16K 17/00 137/14 |
| 2016/0209292 | A1* | 7/2016 | Dudar | F02M 25/0836 |
| 2016/0221436 | A1* | 8/2016 | Lindlbauer | F17D 5/02 |
| 2016/0298579 | A1* | 10/2016 | Peters | F16K 31/10 |
| 2017/0045019 | A1* | 2/2017 | Dudar | F02M 25/0854 |
| 2017/0066322 | A1* | 3/2017 | Dudar | B60K 15/03 |
| 2017/0114733 | A1* | 4/2017 | Aghili | F02D 41/0032 |
| 2017/0146426 | A1* | 5/2017 | Aso | G01M 3/025 |
| 2017/0174501 | A1* | 6/2017 | Dudar | B67D 7/3272 |
| 2017/0198662 | A1* | 7/2017 | Dudar | F02M 25/0836 |
| 2017/0218885 | A1* | 8/2017 | Dudar | F02D 41/0042 |
| 2017/0342931 | A1* | 11/2017 | Dudar | B60K 15/03 |
| 2017/0356360 | A1* | 12/2017 | Dudar | F02D 41/0045 |
| 2017/0356408 | A1* | 12/2017 | Yang | F02M 37/0076 |
| 2018/0022211 | A1* | 1/2018 | Hill | B60K 15/03504 123/520 |
| 2018/0072556 | A1* | 3/2018 | Dudar | B60K 15/05 |
| 2019/0101072 | A1* | 4/2019 | Dudar | F02D 41/0035 |
| 2019/0271275 | A1* | 9/2019 | Pifher | B60K 6/48 |
| 2020/0086738 | A1* | 3/2020 | Marchlewski | B62D 27/06 |
| 2020/0102203 | A1* | 4/2020 | Dudar | B60K 15/03504 123/520 |
| 2020/0149483 | A1* | 5/2020 | Dudar | F02M 25/0222 701/102 |

* cited by examiner

REFUELING CONTROL SYSTEMS AND METHODS FOR PRESSURIZED VEHICLE FUEL SYSTEMS

TECHNICAL FIELD

This disclosure relates to vehicle fuel systems, and more particularly to refueling control systems and associated methods for pressurized vehicle fuel systems.

BACKGROUND

Many automotive vehicles include pressurized fuel systems. The pressurized fuel systems of some vehicles, such as hybrid electric vehicles (HEVs) and plug-in hybrid electric vehicles (PHEVs), typically must be depressurized before beginning a refueling event to prevent fuel from being expelled from the system through an inlet of a fuel fill conduit.

SUMMARY

A fuel system for a vehicle according to an exemplary aspect of the present disclosure includes, among other things, a fuel tank, a fuel inlet conduit connected to the fuel tank, a first valve located within the fuel inlet conduit and actuable between a closed position and an open position, a vapor recovery recirculation line connected to the fuel tank, a second valve located within the vapor recovery recirculation line and actuable between a closed position and an open position, and a controller configured to automatically actuate the first valve and the second valve from the closed positions to the open positions when a pressure within the fuel tank is within a predefined threshold pressure range.

In a further non-limiting embodiment of the foregoing fuel system, the controller is configured to command a depressurization sequence of the fuel tank to begin in response to receiving a fuel door position signal.

In a further non-limiting embodiment of either of the foregoing fuel systems, a fuel door position monitoring device is configured to monitor a position of the fuel door and communicate the fuel door position signal to the controller when the fuel door is moved from a closed position to an open position.

In a further non-limiting embodiment of any of the foregoing fuel systems, the fuel door position monitoring device includes a sensor or a switch.

In a further non-limiting embodiment of any of the foregoing fuel systems, a fuel tank pressure transducer is configured to monitor the pressure within the fuel tank.

In a further non-limiting embodiment of any of the foregoing fuel systems, the controller is configured to actuate the first and second valves to the open positions in response to receiving an input signal from the fuel tank pressure transducer.

In a further non-limiting embodiment of any of the foregoing fuel systems, the input signal indicates that the pressure of the fuel tank is within the predefined threshold pressure range.

In a further non-limiting embodiment of any of the foregoing fuel systems, the first and second valves are electronically controllable solenoids.

In a further non-limiting embodiment of any of the foregoing fuel systems, a manual tether is connected to the first valve and actuable to override a current positioning of the first valve.

In a further non-limiting embodiment of any of the foregoing fuel systems, the fuel system is a Non-Integrated Refueling Canister Only System (NIRCOS).

A vehicle refueling control method according to another exemplary aspect of the present disclosure includes, among other things, monitoring a positioning of a fuel door of a vehicle fuel system, automatically initiating a depressurization sequence of a fuel tank of the vehicle fuel system in response to receiving a first input signal indicating that the fuel door has been moved from a closed position to an open position, automatically opening a first valve positioned within a fuel inlet conduit of the fuel system and a second valve positioned within a vapor recovery recirculation line of the fuel system in response to receiving a second input signal indicating that a pressure within the fuel tank is within a predefined threshold pressure range.

In a further non-limiting embodiment of the foregoing method, the method includes, prior to initiating the depressurization sequence, determining whether the vehicle is in park.

In a further non-limiting embodiment of either of the foregoing methods, the first input signal is communicated from a fuel door position monitoring device and the second input signal is communicated from a fuel tank pressure transducer.

In a further non-limiting embodiment of any of the foregoing methods, the fuel door position monitoring device includes a sensor or a switch.

In a further non-limiting embodiment of any of the foregoing methods, the method includes allowing the fuel tank to be refueled only when the pressure of the fuel tank is within the predefined threshold pressure range.

In a further non-limiting embodiment of any of the foregoing methods, the method includes actuating a manual tether to override a current positioning of the first valve.

In a further non-limiting embodiment of any of the foregoing methods, the first valve and the second valve are electronically controllable solenoids.

In a further non-limiting embodiment of any of the foregoing methods, the vehicle fuel system is part of a Non-Integrated Refueling Canister Only System (NIRCOS).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to vehicle fuel systems capable of isolating the energy within a fuel tank from the vehicle user. An exemplary fuel system may include a first valve located within a fuel inlet conduit and a second valve located within a vapor recovery recirculation line of the fuel system. The first and second valves may be controlled based on the pressure inside a fuel tank of the fuel system. Fuel may only be transferred into the fuel tank when the fuel tank is within a predefined threshold pressure range. A depressurization sequence of the fuel tank may be automatically initiated when a fuel door of the fuel system is moved to an open position. The positioning of the fuel door may be monitored by a fuel door position monitoring device. These and other features of this disclosure are described in greater detail below.

Figure 1:
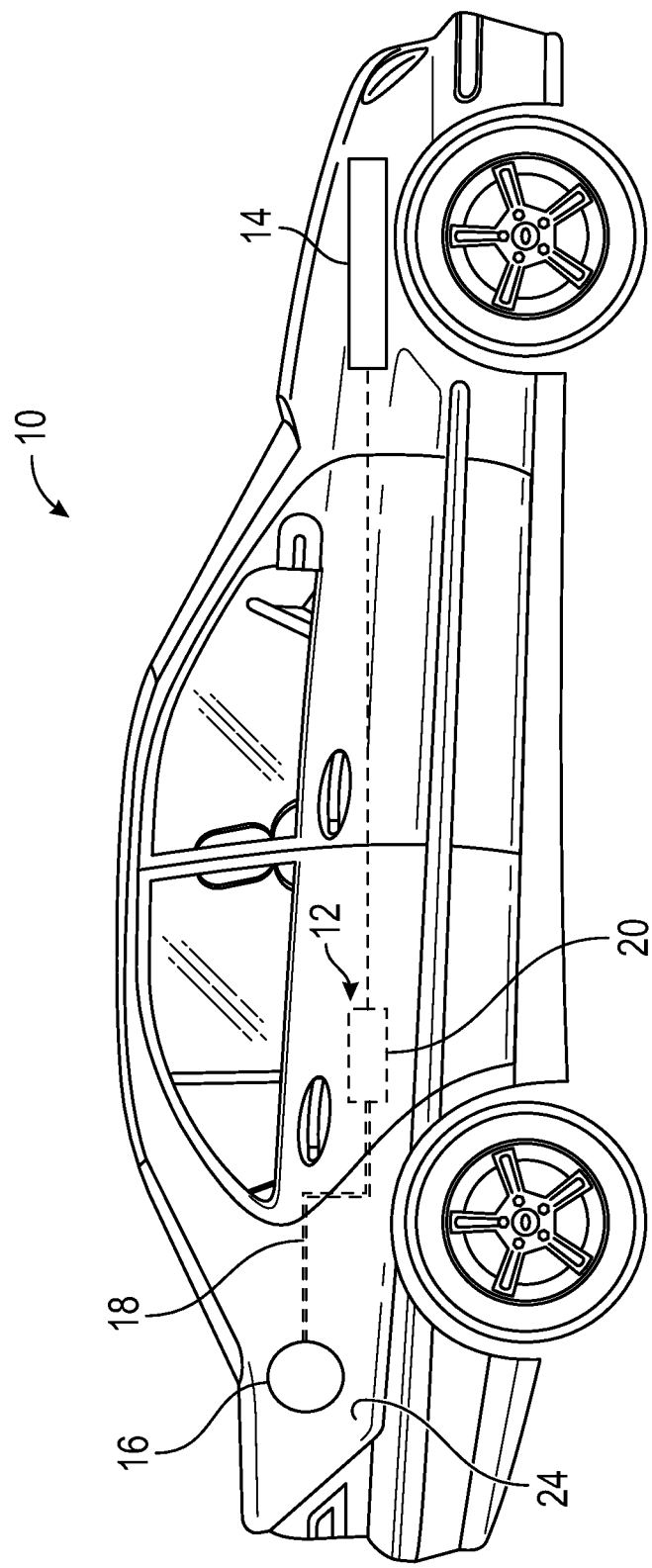
FIG. 1 schematically illustrates a vehicle equipped with a fuel system.

FIG. 1 schematically illustrates a vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a fuel system 12 for delivering fuel to an engine 14. The fuel system 12 may include, among various other components which will be further described below, a fuel door 16, a fuel inlet conduit 18, and a fuel tank 20. The fuel inlet conduit 18 extends between the fuel door 16 and the fuel tank 20 and provides fluid access to the fuel tank 20 when the fuel door 16 is opened and other conditions of the fuel tank 20 are met. The fuel tank 20 stores the fuel (e.g., gasoline, diesel, etc.) necessary for powering the engine 14.

The fuel door 16 is shown in a closed position in FIG. 1. When the fuel door 16 is rotated to the closed position, the fuel door 16 is substantially flush to a vehicle body component 24, such as a rear side panel of the vehicle 10, for example.

Figure 2:
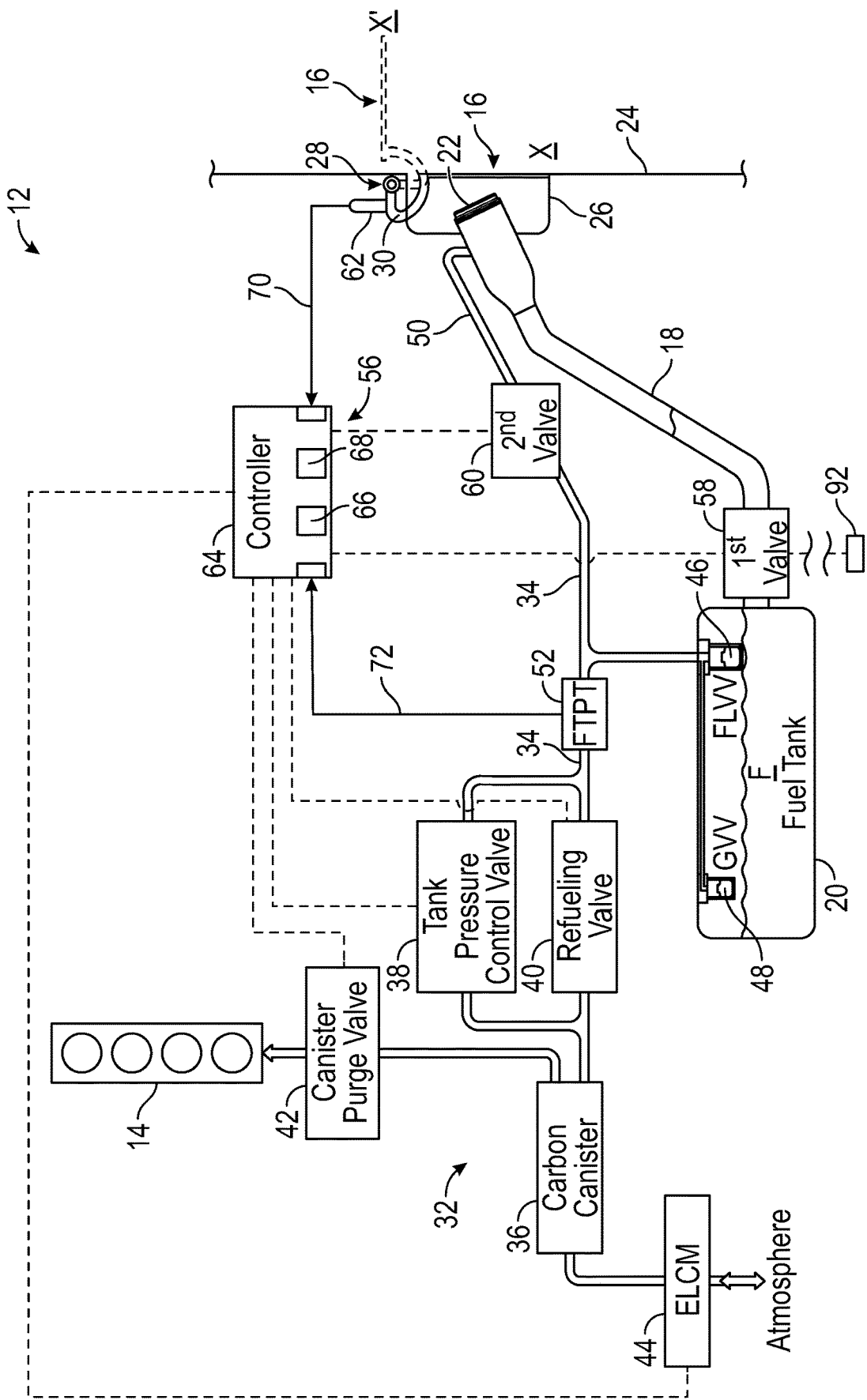
FIG. 2 schematically illustrates an exemplary fuel system of the vehicle of FIG. 1.

The fuel system 12 is illustrated in greater detail in FIG. 2. A housing 26 may circumferentially surround an inlet opening 22 of the fuel inlet conduit 18. The housing 26 may extend from the fuel inlet conduit 18 to the vehicle body component 24 to cover a gap between the fuel inlet conduit 18 and the vehicle body component 24.

The fuel door 16 may be connected to the housing 26 by a hinge assembly 28. A hinge arm 30 of the hinge assembly 28 may control movement of the fuel door 16 between a closed position X (shown in solid lines) an open position X' (shown in phantom lines) relative to the housing 26.

The fuel system 12 may be a capless fuel system, which, for purposes of this disclosure, means that no separate cap is removably secured relative to the fuel inlet conduit 18 to seal and cover the inlet opening 22.

To refuel the fuel tank 20, a fuel dispensing nozzle of a fuel pump (not shown) may be inserted through the inlet opening 22 of the fuel inlet conduit 18. Fuel can then be delivered from a fuel supply, through the fuel dispensing nozzle, into the fuel inlet conduit 18, and ultimately into the fuel tank 20 during vehicle refueling events if and when the conditions of the fuel tank 20 are suitable for refueling.

In an embodiment, the fuel system 12 is designed to retain fuel vapors to meet evaporative emissions requirements. The fuel system 12 may be a Non-Integrated Refueling Canister Only System (NIRCOS). As a result, the fuel system 12 can achieve vapor pressures and vacuum levels higher than conventional fuel systems. However, the teachings of this disclosure are not limited to NIRCOS fuel systems and could apply to any pressurized fuel system for any vehicle.

The fuel system 12 may include a fuel vapor recovery system 32 configured for controlling the vapor pressures and vacuum levels within the fuel tank 20. The fuel vapor recovery system 32 may include a fuel vapor recovery line 34 and a carbon canister 36. Vapor produced in the fuel tank 20 may be routed to the fuel vapor recovery line 34 and be absorbed by the carbon canister 36. One or more fuel vapor valves 38, 40 may be arranged in the fuel vapor recovery line 34 to selectively disconnect or connect the fuel tank 20 to recover fuel vapor.

Moreover, the carbon canister 36 may be connected to the engine 14 by a canister purge valve 42 such that the recovered fuel vapor may be purged or recirculated to engine 14 for combustion. In an embodiment, the canister purge valve 42 is solenoid valve that is open in its default position and includes a purge rate regulated by the fuel vapor valves 38, 40, which are positioned upstream of the carbon canister 36. The other end of the carbon canister 36 may communicate with atmosphere via an electronic leak check module (ELCM) 44 so that filtered air may be released to the atmosphere.

Among other functions, the fuel vapor valves 38, 40 may allow the carbon canister 36 to be maintained at a low pressure without increasing the fuel evaporation rate from the fuel tank 20, which would otherwise occur if the fuel tank 20 pressure was lowered. The fuel vapor valves 38, 40 may be configured to allow different vapor flowing rates, and fuel vapor recovery under different vapor pressures may be allowed by opening different valves. It should be appreciated that the number of valves 38, 40 may vary. For example, one valve or more than two valves may be implemented within the fuel vapor recovery system 32. Although the fuel vapor valves 38, 40 are shown in the fuel vapor recovery line 34, it should be understood that valves may be at different locations, such as integrated with the carbon canister 36, for example.

One or more vent valves may control the release of fuel vapors from the fuel tank 20 into the fuel vapor recovery line 34. In an embodiment, a fuel level vent valve (FLVV) 46 and a grade vent valve (GVV) 48 are configured to vent fuel vapors into the fuel vapor recovery line 34.

The fuel system 12 may further include a vapor recovery recirculation line 50 for limiting loading of the carbon canister 36 by allowing a portion of the fuel vapor from the fuel tank 20 to return to the fuel inlet conduit 18. The vapor recovery recirculation line 50 may be coupled on a first end to the fuel tank 20 and on a second, opposite end to the fuel inlet conduit 18. In an embodiment, the vapor recovery recirculation line 50 is coupled to the fuel tank 20 by the FLVV 46 and is coupled to the fuel inlet conduit 18 at some point downstream of the inlet opening 22. However, other configurations are also contemplated within the scope of this disclosure.

The fuel system 12 can incorporate a pressure management system that ensures that a pressure within the fuel tank 20 is maintained within a particular threshold range. The pressure within the fuel tank 20 may be monitored by a fuel tank pressure transducer (FTPT) 52. Adjusting the pressure within the fuel tank 20 may be required prior to refueling the fuel tank 20. For example, if the pressure is too high, reducing the pressure may be needed prior to refueling to lessen the potential for fuel/fuel vapors escaping from the fuel system 12 through the inlet opening 22. In an embodiment, adjusting the pressure within the fuel tank 20 can require anywhere from approximately three to fifteen seconds. After the pressure is appropriately adjusted, the user can begin to refuel the fuel tank 20. The process of adjusting the pressure within the fuel tank 20 to be within a particular threshold range may be referred to within this disclosure as a fuel tank depressurization sequence, or simply depressurization sequence.

In many fuel systems, the fuel tank depressurization sequence is typically initiated when a user has pushed a fuel door opening button located inside a passenger cabin of the vehicle 10 or has otherwise physically indicated a desire to begin refueling. The fuel door of prior fuel systems is typically kept locked until the depressurization sequence is completed. This strategy typically involves a complex and expensive fuel door locking mechanism and interface between the fuel system control and the fuel door locking control, and can be relatively complex and confusing from the perspective of the vehicle user. Accordingly, refueling control systems that reduce the complexity of the vehicle refueling process are proposed within this disclosure.

An exemplary refueling control system 56 of the fuel system 12 is additionally illustrated in FIG. 2. The refueling control system 56 may be employed to control the energy interface between the fuel system 12 and the vehicle user prior to and during vehicle refueling events. The refueling control system 56 may include a first valve 58, a second valve 60, a fuel door position monitoring device 62, and a controller 64. These components of the refueling control system 56 are described in further detail below.

The first valve 58 may be positioned within the fuel inlet conduit 18 and is configured for isolating the fuel F stored in the fuel tank 20 from the fuel inlet conduit 18. The second valve 60 may be positioned within the vapor recovery recirculation line 50 and is configured for isolating the energy in the fuel vapor recovery system 32 from the fuel inlet conduit 18. A default position of the first and second valves 58, 60 is a closed position. The first and second valves 58, 60 may each be actuated from the closed position to an open position when a pressure of the fuel tank 20 is within a predefined threshold pressure range. In the open positions of the first and second valves 58, 60, the fuel tank 20 is fluidly connected to the fuel inlet conduit 18. Therefore, the vehicle user can only begin refueling when the pressure of the fuel tank 20 is within the predefined threshold pressure range.

In an embodiment, the first and second valves 58, 60 are electronically controllable solenoid valves. However, other types of valves, including but not limited to pressure/vacuum actuated valves, are also contemplated within the scope of this disclosure.

The fuel door position monitoring device 62 is configured for monitoring a positioning of the fuel door 16. For example, the fuel door position monitoring device 62 may be capable of detecting whether the fuel door 16 is in the closed position X or the open position X'. In an embodiment, the fuel door position monitoring device 62 is a sensor or a grouping of sensors. In another embodiment, the fuel door position monitoring device 62 is a switch. The fuel door position monitoring device 62 may be in electrical communication with the controller 64 for determining when to initialize a depressurization sequence of the fuel tank 20.

The controller 64 may be part of an overall vehicle control system or could be a separate controller (e.g., a powertrain control module (PCM)) that communicates with the vehicle control system. The controller 64 may be equipped with the necessary hardware and software for interfacing with and commanding operation of various components of the fuel system 12.

In an embodiment, the controller 64 includes a processing unit 66 and non-transitory memory 68 for executing the various control strategies and operations of the fuel system 12. The processing unit 66, in an embodiment, is configured to execute one or more programs stored in the memory 68 of the controller 64.

A first exemplary program, when executed, may be employed to initiate the fuel tank 20 depressurization sequence in response to receiving a first input signal 70 from the fuel door position monitoring device 62. In an embodiment, the first input signal 70 is automatically communicated from the fuel door position monitoring device 62 to the controller 64 in response to the fuel door 16 being moved to the open position X'. The first input signal 70 therefore provides an input to the controller 64 for inferring or anticipating that the user desires to refuel the vehicle 10. In response to receiving the first input signal 70, the controller 64 can automatically command initiation of the fuel tank 20 depressurization sequence to bring the pressure of the fuel tank 20 within a range that is acceptable for refueling.

A second exemplary program, when executed by the controller 64, may be employed to automatically actuate the first and second valves 58, 60 from the closed positions to the open positions in response to receiving a second input signal 72, such as from the electrically connected FTPT 52, indicating that the pressure inside the fuel tank 20 is within the predefined threshold pressure range. Once the first and second valves 58, 60 are opened, the fuel inlet conduit 18 is no longer isolated from the fuel tank 20, thereby allowing the user to refuel.

The fuel system 12 may optionally include a manual tether 92 that can be used to actuate the first control valve 58 to its open position in the event of a fuel system component failure. The fuel system component failure may include a failure of one or more of the FTPT 52, the first valve 58, the second valve 60, and/or the fuel door position monitoring device 62. Pulling or otherwise actuating the manual tether 92 can manually override the current position of the first valve 58, thereby permitting refueling even in the event of a system failure.

Figure 3:
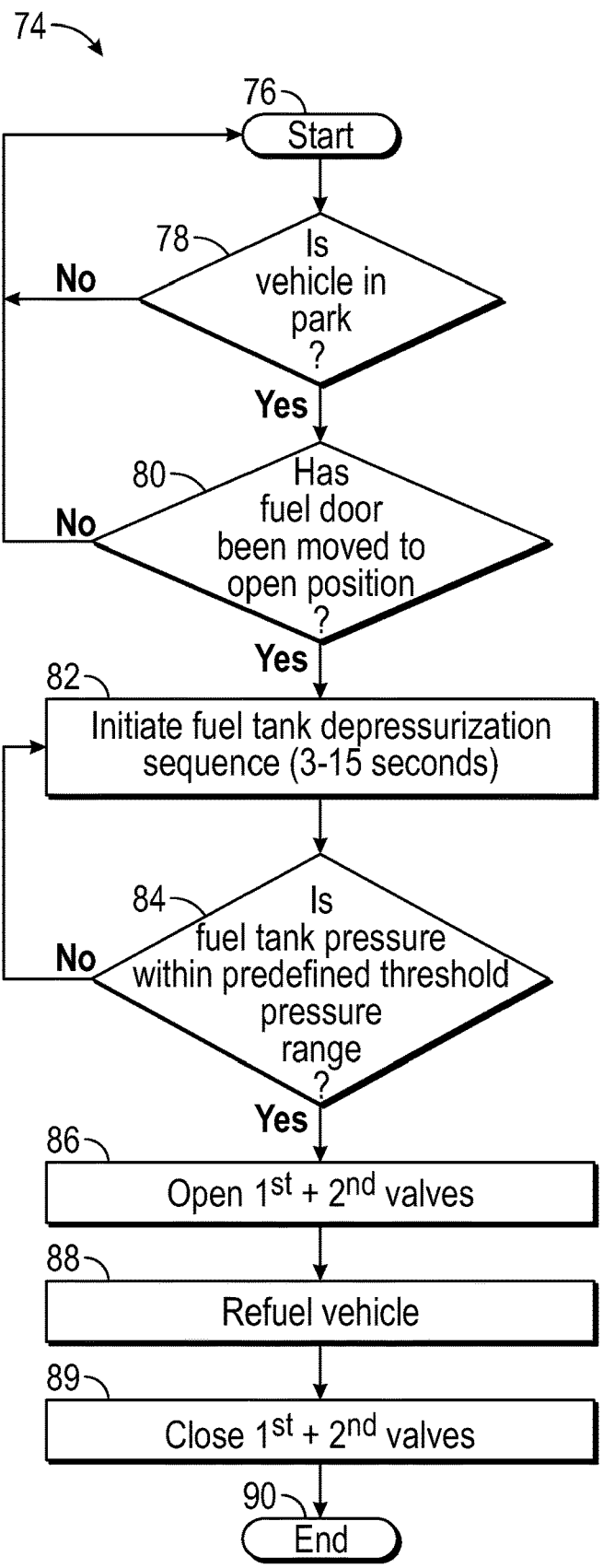
FIG. 3 schematically illustrates an exemplary vehicle refueling control method.

An exemplary refueling control method 74 is schematically illustrated in FIG. 3. The refueling control method 74 may be a control strategy that is executed in order to significantly reduce the confusion that may be associated with refueling a vehicle 10 equipped with the fuel system 12 of FIG. 2. In an embodiment, the controller 64 is programmed with one or more algorithms adapted to execute the exemplary refueling control method 74. In another embodiment, the refueling control method 74 is stored as executable instructions (e.g., software code) in the memory 68 of the controller 64.

The refueling control method 74 may begin at block 76. At block 78, the controller 64 may determine whether the vehicle 10 is in park. For example, the controller 64 may communicated with and receive signals from a shift device that can be used to shift the transmission into park (P), reverse (R), neutral (N), drive (D), low (L), etc. In an embodiment, a signal is sent to the controller 64 when the shift device is moved to the park (P) position.

If the vehicle 10 is in park, the controller 64 may determine whether the fuel door 16 has been moved to the open position at block 80. For example, the controller 64 may determine whether the first input signal 70 has been received from the fuel door position monitoring device 62, thereby indicating that the fuel door 16 has moved from the closed position X to the open position X'.

If both blocks 78 and 80 return YES flags, the controller 64 may automatically command the fuel tank 20 depressurization sequence to begin at block 82. The fuel tank depressurization sequence may involve decreasing the pressure of the fuel tank 20 to be within a predefined threshold pressure range. The first and second valves 58, 60 of the refueling control system 56 remain closed during the depressurization sequence.

Next, at block 84, the controller 64 may confirm whether the pressure inside the fuel tank 20 is within the predefined threshold pressure range. IF YES, the controller 64 may command the first and second valves 58, 60 to their open positions at block 86. The user may then begin refueling at block 88. Once refueling is completed, the controller 64 may command the first and second valves 58, 60 to their closed positions at block 89. The refueling control method 74 may end at block 90.

The refueling control systems and associated methods of this disclosure are configured to reduce the expense and complexity associated with pressurized vehicle fuel systems. For example, components used in prior systems, such as the refueling button, fuel door locking mechanisms, cluster messaging, and inlet check valve, may be eliminated from the exemplary systems. The proposed systems and methods significantly reduce the perceived confusion and complexity of the vehicle refueling process, thereby improving customer satisfaction in a simple and cost effective manner.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fuel system for a vehicle, comprising:
a fuel tank;
a fuel inlet conduit connected to the fuel tank;
a first valve located within the fuel inlet conduit and actuable between a fully closed position and an open position;
a vapor recovery recirculation line connected to the fuel tank;
a second valve located within the vapor recovery recirculation line and actuable between a fully closed position and an open position; and
a controller configured to automatically actuate the first valve and the second valve from the fully closed positions to the open positions when a pressure within the fuel tank is within a predefined threshold pressure range.

2. The fuel system as recited in claim 1, wherein the controller is configured to command a depressurization sequence of the fuel tank to begin in response to receiving a fuel door position signal.

3. The fuel system as recited in claim 2, comprising a fuel door position monitoring sensor or switch configured to monitor a position of the fuel door and communicate the fuel door position signal to the controller when the fuel door is moved from a closed position to an open position.

4. The fuel system as recited in claim 1, comprising a fuel tank pressure transducer configured to monitor the pressure within the fuel tank.

5. The fuel system as recited in claim 4, wherein the controller is configured to actuate the first and second valves to the open positions in response to receiving an input signal from the fuel tank pressure transducer, and further wherein the input signal indicates that the pressure of the fuel tank is within the predefined threshold pressure range.

6. The fuel system as recited in claim 1, wherein the first and second valves are electronically controllable solenoid valves.

7. The fuel system as recited in claim 1, comprising a manual tether connected to the first valve and actuable to override a current positioning of the first valve.

8. The fuel system as recited in claim 1, wherein the fuel system is a Non-Integrated Refueling Canister Only System (NIRCOS).

9. The fuel system as recited in claim 1, wherein the first valve is located within the fuel inlet conduit at a location that is downstream from an inlet opening of the fuel inlet conduit.

10. The fuel system as recited in claim 9, wherein the location of the first valve is closer to the fuel tank than to the inlet opening.

11. The fuel system as recited in claim 1, wherein a default position of the first valve and the second valve is the fully closed position, and further wherein the fuel inlet conduit is isolated from both the fuel tank and a fuel vapor recovery system when the first and second valves are positioned in the fully closed positions.

12. The fuel system as recited in claim 1, wherein the fuel system is a capless fuel system.

13. The fuel system as recited in claim 1, wherein the first valve and the second valve are pressure/vacuum actuated valves.

14. A refueling control method for a vehicle, comprising:
monitoring a positioning of a fuel door of a vehicle fuel system;
automatically initiating a depressurization sequence of a fuel tank of the vehicle fuel system in response to receiving a first input signal indicating that the fuel door has been moved from a closed position to an open position; and
automatically opening a first valve positioned within a fuel inlet conduit of the vehicle fuel system and a second valve positioned within a vapor recovery recirculation line of the vehicle fuel system in response to receiving a second input signal indicating that a pressure within the fuel tank is within a predefined threshold pressure range,
wherein automatically opening the first and second valves includes moving the first and second valves from a fully closed position to an open position.

15. The method as recited in claim 14, comprising, prior to initiating the depressurization sequence:
determining whether the vehicle is in park.

16. The method as recited in claim 14, wherein the first input signal is communicated from a fuel door position sensor or switch and the second input signal is communicated from a fuel tank pressure transducer.

17. The method as recited in claim 14, comprising:
   allowing the fuel tank to be refueled only when the pressure of the fuel tank is within the predefined threshold pressure range.

18. The method as recited in claim 14, comprising:
   actuating a manual tether to override a current positioning of the first valve.

19. The method as recited in claim 14, wherein the first valve and the second valve are electronically controllable solenoid valves.

20. The method as recited in claim 14, wherein the vehicle fuel system is part of a Non-Integrated Refueling Canister Only System (NIRCOS).

\* \* \* \* \*